INVENTOR.
WILLIS O. SOLBERG

_United States Patent Office_ 3,463,992
Patented Aug. 26, 1969

3,463,992
ELECTRICAL CAPACITOR SYSTEMS HAVING LONG-TERM STORAGE CHARACTERISTICS
Willis O. Solberg, Fort Edward, N.Y., assignor to General Electric Company, a corporation of New York
Filed June 13, 1966, Ser. No. 557,169
Int. Cl. H02j 7/00
U.S. Cl. 320—1                                     5 Claims

ABSTRACT OF THE DISCLOSURE

A long-term capacitive storage system is disclosed which employs capacitors of different time constants and connected in series and charged with a voltage magnitude and polarity different for each capacitor.

---

This invention relates to a method and means for storing energy over long periods. It relates more specifically to a capacitor network capable of storing energy at a high voltage for a long time with substantially no loss. In fact, under certain conditions, the energy available from the network actually increases with time over a predetermined portion of the storage period.

The long-term capacitive storage systems here concerned should be able to hold the required charge for six or eight months or more without recharging, and have a specified voltage available at any time during this period. They may be used, for example, as a source of voltage which is called into use upon the detection of a relatively rare event.

Conventionally, such long-term storage devices have comprised a single capacitor whose terminal voltage decays according to the well-known equation:

$$e = E_o \exp\left(-\frac{t}{RC}\right)$$

where:
$e$ = terminal voltage
$E_o$ = initial charging voltage
$t$ = time
$R$ = internal resistance
$C$ = capacitance Among the best of these are capacitors containing polystyrene as the dielectric. Their voltage decay is of the order of 0.5% to 1.0% per thousand hours. Actually, their voltage decay is somewhat slower than the above formula predicts because of a gradual increase in the internal resistance (R) with time. In any event, this means that plain polystyrene capacitors lose about 0.5% to 1% of their initial voltage during the first fifty days of the storage period. With continued storage, of course, the voltage continues to decay expotentially and, as a practical matter, these capacitors lose a large portion of their available energy over a six-month storage period.

This invention aims to provide a storage capacitor network whose terminal voltage decays at a materially lower rate than that of a conventional long-term storage capacitor.

Another object of this invention is to provide a long-term storage capacitor network whose available energy remains substantially constant over a long storage period.

Still another object of this invention is to provide a capacitor network of the above type whose available energy actually increases for a predetermined storage time.

Still another object of this invention is to provide a capacitive energy storage device capable of delivering power to a large load at substantially constant voltage or constant current.

Another object of this invention is to provide a capacitive energy storage device which can be easily and economically fabricated as a single unit, using conventional capacitor manufacturing techniques.

Another object of the invention is to produce a method of storing energy over a long period of time with minimum loss.

The invention accordingly comprises the several steps and the relation of one or more of such steps with respect to each other, and the apparatus embodying the features of construction, combination of elements, and arrangement of parts, which are adapted to effect such steps all as exemplified in the following detailed disclosure, and the scope of the invention will be indicated in the claims.

For a fuller understanding of the nature and objects of the invention, reference should be had to the following detailed description taken in connection with the accompanying drawings, in which.

In general, my long-term energy storage network employs at least two capacitors connected in series. The two capacitors have different time constants, the time constant of one being longer than the expected storage time; preferably it is as long as possible for best results. Terminals are provided so that voltages can be applied separately to the capacitors. When the two capacitors are charged separately to unequal voltages of opposite polarity, the voltage across the series-connected pair decays at a much slower rate than the voltage across either element taken separately.

In addition, proper selection of the charging voltage ratios obtains a wide variety of voltage decay characteristics from the network. Thus the network can be made to supply a substantially constant voltage for a long period. Further, for given capacitors, if the magnitudes of the initial charging voltages on each capacitor are sufficiently increased while keeping their algebraic sum a constant, the total energy available from the capacitor network can be made to increase in a predetermined manner during a large portion of the storage period.

Used in this way, the energy storage system can substitute for a battery in many applications. Like a battery, it makes energy available for immediate use after a long waiting period, say, upon the happening of an event. Unlike a battery, however, the energy storage system has the advantage of a very short recharge cycle. Moreover, it is very much smaller, lighter and easier to manufacture than a battery, particularly when a high output voltage is required.

Figure 1:
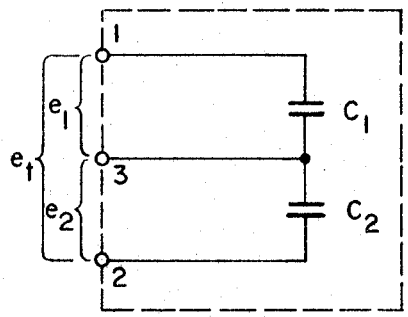
FIG. 1 is a schematic diagram of an energy storage network embodying the principles of my invention.

Referring now to FIG. 1 of the drawings, a simple embodiment of the invention comprises a pair of capacitors C1 and C2 connected together in series. The system has three terminals 1, 2, and 3. The capacitor C1 is connected between terminals 1 and 3, while capacitor C2 is connected between terminals 2 and 3. The output voltage $e_t$ of the network, appearing between terminals 1 and 2, is the algebraic sum of the voltages $e_1$ and $e_2$ across the respective capacitors.

It is essential to the desired network operation that the two capacitors C1 and C2 have different time constants. One capacitor C2, for example, is preferably a polystyrene capacitor of the type customarily used for long-term energy storage. As noted above, for best results, it should have as long a time constant as possible. The other capacitor C1 has a shorter time constant than capacitor C2. It may comprise, for instance, a conventional dry polyethylene terephthalate or an incompletely processed polystyrene dielectric.

The selection of the particular time constants can, of course, be accomplished in different ways. Thus, in one particular embodiment of my invention, the two capacitors C1 and C2 have the same capacitance but different internal resistance, the resistance of capacitor C1 being only one-half that of capacitor C2. The same 2 to 1 time constant relationship may be obtained also with two capacitor elements having the same internal resistance but different capacitance. Another mode of accomplishing the same result is to select two identical capacitors and connect a resistor in shunt with one of them to reduce its effective time constant. We should mention at this point that the term "capacitor" as used in this application includes both the internal resistance of the capacitor and any external resistance shunted across the capacitor. The preferable general relationship between the time constants of the capacitors C1 and C2 will be discussed presently in detail.

Figure 2:
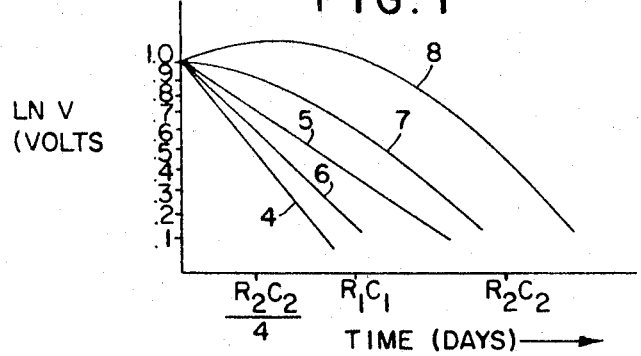
FIG. 2 is a graph comparing voltage decay of an energy storage system embodying the invention with that of a typical conventional long-term storage capacitor.

Refer now to FIG. 2 which is a normalized logarithmic graph of the variations of the respective voltages in the network of FIG. 1 as a function of time after the network has been disconnected from the charging source. Assume a 2 to 1 time constant relationship between capacitors C2 and C1, and assume further that the capacitors have been separately charged by means of the terminals 1, 2 and 3. The voltage $e_1$ across the capacitor C1 will decay ideally according to curve 4 and the voltage $e_2$ across capacitor C2 will decay ideally according to curve 5. As noted above, due to capacitor aging, the voltages decay somewhat more slowly than indicated by the curves 4 and 5. However, this aging factor does not materially affect the overall characteristics of the system.

If the series-connected capacitors C1 and C2 are initially charged to equal voltages, the total voltage $e_t$ across the network, i.e. between terminals 1 and 2 (FIG. 1) will decay ideally in accordance with the curve 6. As might be expected, the curve 6 is intermediate between the decay curves 4 and 5 for the individual capacitors C1 and C2.

If, however, the charging voltages applied to the two capacitor elements C1 and C2 are unequal and of opposite polarity, the voltage across the network will decay more slowly than the voltage across either of the individual capacitors. Thus, for example. if the capacitor C2 having the longer time constant is charged initially to twice the voltage across the capacitor C1, with opposite polarity, the network terminal voltage $e_t$ will decay according to curve 7. It is readily apparent from curve 7 that the voltage decay characteristic of the network is materially superior to those of the individual capacitors C1 and C2.

Not only does the network voltage decay at a much lower rate than that of the element C2 having the longer time constant R2C2, but also as seen from curve 7, the amount of voltage decay is quite negligible for a period of time equal to approximately R2C2/4. This means that during such an interval of time, the capacitor network will have an available output voltage substantially equal to its initial voltage.

Still referring to FIG. 2, if the initial voltages applied to the separate capacitors C1 and C2 are sufficiently increased while keeping their algebraic sum a constant, the voltage $e_t$ between terminals 1 and 2 is found to increase for an appreciable period of time after charging. For example, if the charging voltage $E_2$ applied to capacitor C2 is 300 volts and the voltage $E_1$ separately impressed across capacitor C1 is −200 volts, the voltage $e_t$ between terminals 1 and 2 will decay in accordance with the curve 8. It is readily seen from curve 8 that the network voltage $e_t$ increases appreciably for a period of time in excess of R2C2/4.

By appropriately varying the ratio of the charging voltages applied to the capacitors C1 and C2, a wide variety of voltage decay characteristics can be derived from the network. Moreover, additional variations are possible by varying the ratio of the time constants of the two capacitors.

The decay of the network voltage $e_t$ is governed by:

$$e_t = e_1 + e_2 = E_1 \exp\left(-\frac{t}{R1C1}\right) + E_2 \exp\left(-\frac{t}{R2C2}\right) \quad (1)$$

Making use of the approximation $$\exp(x) = 1 + x \quad (2)$$

Equation 1 may be rewritten as $$e_1 + e_2 = E_1\left(1 - \frac{t}{R1C1}\right) + E_2\left(1 - \frac{t}{R2C2}\right) \quad (3)$$

With the desired constant network output voltage $e_t$, the sum $(e_1 + e_2)$ will continuously equal the sum of the initial charging voltages, i.e. $E_1 + E_2$. Thus, $$E_1 + e_2 = E_1\left(-\frac{t}{R1C1}\right) + E_2\left(1 - \frac{t}{R2C2}\right) \quad (4)$$

which can be reduced to $$\frac{E_1}{E_2} = -\frac{R1C1}{R2C2} \quad (5)$$

The approximation (2) is accurate to within 0.5% for values of $x$ less than 0.1. Acscordingly, Equation 3 is essentially correct for values of $t$ less than 10% of the shorter time constant R1C1 and charging the network initially in accordance with Equation 5 will produce a substantially constant network output voltage $e_t$ for an interval up to about 0.1 R1C1.

As the absolute value of the ratio $E_1/E_2$ is decreased from $$-\frac{R1C1}{R2C2}$$

the capacitor network behaves more like a conventional capacitor. That is, its terminal voltage $e_t$ decays steadily with time.

However, as $E_1/E_2$ is increased from $$-\frac{R1C1}{R2C2}$$

the network voltage increases initially before starting its eventual exponential decay. This holds true until the ratio equals unity, whereupon $E_1 = -E_2$ and there is zero voltage across the network. Thus it is even possible to charge the network so that it will have zero voltage initially and a determined finite output voltage at some later time. By proper selection of the various parameters, the time when the network voltage begins to decay appreciably can be delayed at least as long as the shorter time constant R1C1. This may result in some overvoltage during the storage period. However, this generally tolerable, since most circuits accommodate voltage variations of at least ±10%.

Figure 3:
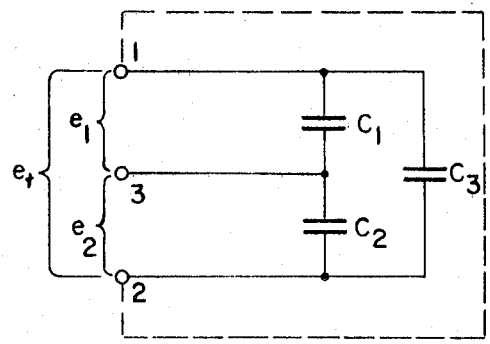
FIG. 3 is a schematic diagram of a modified form of the energy storage network.

FIG. 3 shows a modified form of storage system which is able to supply a substantially constant voltage to a high resistance load. The system has the same series-connected capacitors C1 and C2. As before, the capacitor C1 is connected between terminals 1 and 3 and capacitor C2 is connected between terminals 2 and 3. Additionally, a third capacitor C3 is connected between the output terminals 1 and 2, in parallel with capacitors C1 and C2.

In this circuit, as before, capacitor C2 has as long a time constant (R2C2) as possible. Desirably, also, capacitor C3 has an equally long time constant (R3C3). Capacitor C1, on the other hand, has a shorter time constant (R1C1) and is charged with a voltage having the opposite polarity from the voltage applied to capacitor C2. As before, the voltage $e_1$ is measured across capacitor C1, voltage $e_2$ is measured across capacitor C2 and the voltage $e_t$ is the total voltage across the network. Since the charge provided by capacitors C1 and C2 can also be made greater than the loss of charge occurring continually through capacitor C3, the FIG. 3 system can provide a substantially constant output voltage while delivering small currents to a load. The relationship between the initial voltages and the parameters of the three capacitors can be obtained by solving the following conventional circuit equations:

$$C1\frac{de_1}{dt} + \frac{e_1}{R1} - C3\frac{de_t}{dt} - \frac{e_t}{R3} = 0 \quad (6)$$

$$-C2\frac{de_2}{dt} - \frac{e_2}{R2} + C3\frac{de_t}{dt} + \frac{e_t}{R3} = 0 \quad (7)$$

$$e_1 + e_2 + e_t = 0 \quad (8)$$

Setting $$\frac{de_t}{dt} = 0$$

(i.e. zero slope in the graph of the output voltage $e_t$, FIG. 4), the required relationship for constant output voltage $e_t$ at time $t=0$ is governed by:

$$\frac{E_1}{E_2} = -\frac{\frac{R1R2}{R3}(C1+C2) + R1C1}{\frac{R1R2}{R3}(C1+C2) + R2C2} \quad (9)$$

According to Equation 9, the required relationship does not depend at all upon the capacitance of capacitor C3, but only on its internal resistance R3. Actually, capacitance C3 has no effect on this voltage only as long as the output voltage $e_t$ is constant. When the rest of the circuit acts to change the output voltage $e_t$, the charge on capacitance C3 must change and this capacitance then figures in changes in the output voltage $e_t$.

Equation 9 is valid only at time $t=0$. However, one can optionally assign the time $t=0$ to the point on the time scale of FIG. 4 where the slope of the curve $e_t$ is zero and thereby determine the voltage ratio required at this time for constant voltage $e_t$. Once this is known, the charging voltage ratio can be adjusted slightly to give the voltage $e_t$ the desired positive initial slope as described above in connection with the two capacitor network. Even though the capacitance of capacitor C3 does not figure in the expression for constant voltage $e_t$, it is often desirable to use the capacitor in the network instead of a simple resistor because it is a convenient way to obtain the high resistance R3, and its stored charge offsets somewhat the losses occurring in it. In short, it facilitates a certain amount of flexibility in the circuit design and at the same time provides additional charge-storing capacity.

The net voltage $e_t$ across the third capacitor C3 upon self-discharge of the network decays at a slower rate than the voltage across capacitor C2 having the longer time constant. Thus, it behaves much like the two capacitor network described above. In fact, if in Equation 9, R3 is made infinite (corresponding to removal of that resistor), Equation 9 reduces to $$\frac{E_1}{E_2} = -\frac{R1C1}{R2C2} \quad (5a)$$

which is identical to Equation 5 for the two capacitor network.

In a specific example, capacitors C2 and C3 were identical .04 μf unimpregnated polystyrene capacitors. Capacitor C1 was a dry polyethylene terephthalate capacitor with a capacitance of .047 μf and having a time constant an order of magnitude shorter than that of capacitors C2 and C3. The capacitors were then charged as follows:

TABLE I

| | |
|---|---|
| $E_{1-2}$ | +880 volts (across C3). |
| $E_{3-2}$ | +1640 volts (across C2). |
| $E_{1-3}$ | −760 volts (across C1). |

The network was then stored in the charged condition for 225 days. Representative terminal voltages during this period were as follows:

TABLE II

| Elapsed time (days) | $e_t$ | $e_2$ | $e_1$ (volts) |
|---|---|---|---|
| 0 | 880 | 1,640 | −760 |
| 1 | 890 | 1,635 | −758 |
| 2 | 895 | 1,630 | −755 |
| 9 | 890 | 1,605 | −730 |
| 21 | 900 | 1,560 | −700 |
| 33 | 900 | 1,530 | −670 |
| 40 | 895 | 1,500 | −655 |
| 49 | 900 | 1,490 | −645 |
| 57 | 900 | 1,475 | −625 |
| 90 | 885 | 1,415 | −575 |
| 129 | 870 | 1,390 | −540 |
| 225 | 830 | 1,310 | −480 |

After 225 days, the percentage of the initial voltage remaining across each pair of terminals was as follows.

TABLE III

| | Percent |
|---|---|
| $e_t$ | 94 |
| $e_2$ | 80 |
| $e_1$ | 63 |

As might be expected, the voltage across the polystyrene capacitor C2 decreased less than the voltage on the poorer capacitor C1. Actually, the effective time constant of capacitor C2 over the 225 day period was $1.1 \times 10^8$ seconds as compared with only $3.7 \times 10^7$ seconds for capacitor C1. However, compared to these, the decrease in voltage $e_t$ between the network terminals 1 and 2 was considerably less, giving the network as a whole an effective time constant of $3.2 \times 10^8$ seconds over the 225 day test period.

Figure 4:
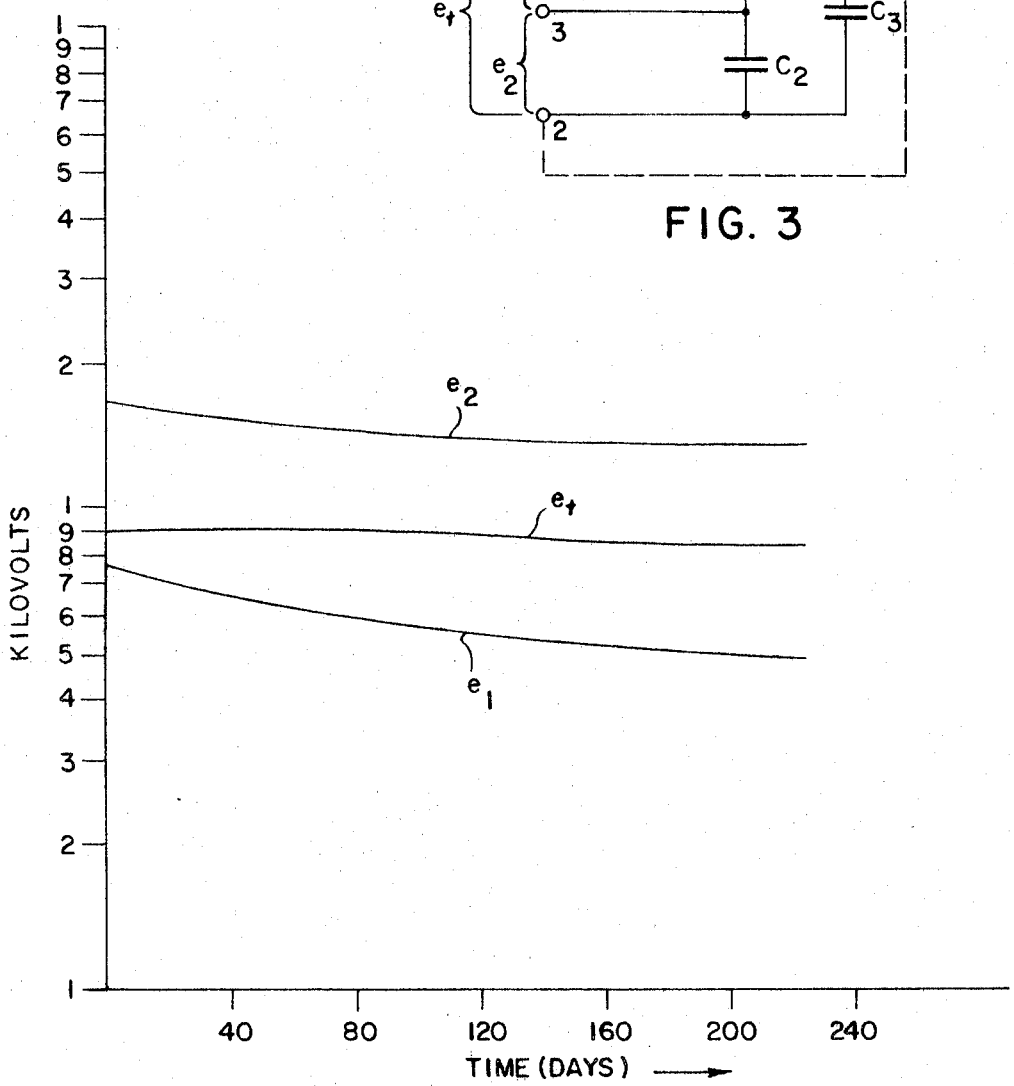
FIG. 4 is a graph showing the voltage decay of the various elements of the network of FIG. 3.

FIG. 4 illustrates graphically the relative voltage decay characteristics of capacitor elements C1 and C2 and the FIG. 3 network as a whole. It is apparent from the Table II and FIG. 4 that the network maintained an apparently infinite time constant for about the first 100 days of electrification, after which the voltage started to decay below its initial value of 880 volts. On the other hand, the plain polystyrene capacitor C2 lost about 14% of its initial voltage during the first 100 days of the storage period. This means that an initial potential of 880 volts on capacitor C2 would decay to about 760 volts during that same period.

Figure 5:
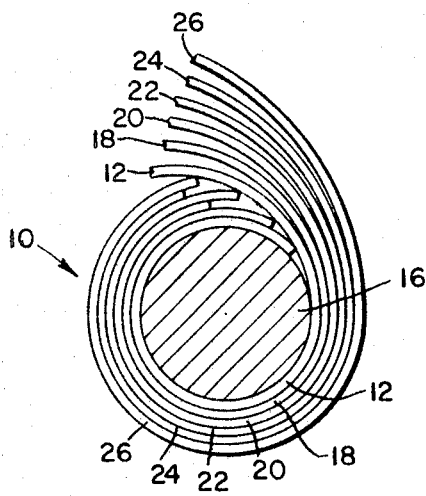
FIG. 5 is a side view of a portion of a three section capacitor embodying the principles of this invention.
Figure 6:
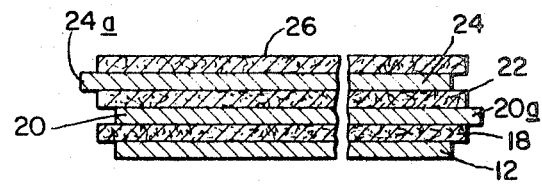
FIG. 6 is a vertical section, showing the elements of the capacitor in FIG. 5 rolled out flat.

Referring now to FIGS. 5 and 6, the three capacitors C1, C2 and C3 of the network illustrated in FIG. 3 are conveniently incorporated as separate capacitor sections in a single roll capacitor unit indicated generally at 10. The capacitor unit 10 is made in the usual way by superimposing strips of conducting foil and insulating paper and winding up the strips on an arbor to form a roll.

A conventional buried foil electrode 12 makes electrical contact at its innermost extremity with a conducting arbor 16. Next to the foil electrode 12 and wound with it are (proceeding radially outwardly from the arbor 16) a dielectric strip 18, a foil electrode 20, a dielectric strip 22, foil electrode 24 and a dielectric strip 26.

The electrodes 12 and 20 and the intervening dielectric strip 18 form capacitor C1, while the electrodes 20 and 24 and the intervening dielectric strip 22 form the capacitor C3. The foil electrodes 20 and 24 are displaced endwise leaving exposed portions 20a and 24a respectively at opposite ends of the unit 10 to provide terminals for the network. When the unit 10 is all wound up, the electrodes 12 and 24 and the then intervening dielectric strip 26 form the capacitor C2. As described previously, the capacitors C2 and C3 should have the highest possible time constants with capacitor C1 having a somewhat shorter time constant.

The appropriate initial charging voltage is applied separately to capacitor C1 by connecting the voltage source between the exposed electrode portion 20a and the buried electrode 12 (through arbor 16). Similarly, the appropriate voltage of opposite polarity is applied to capacitor C2 by connection to its exposed electrode portion 24a and its buried electrode 12 (again through arbor 16). Then, the arbor 16 is removed, and the unit 10 is enclosed by a covering, leaving exposed only the portions 20a and 24a of electrodes 20 and 24 respectively to serve as output terminals for the capacitor unit 10.

It is readily seen from the foregoing that my capacitive energy storage system supplies a voltage which decays at a materially lower rate than those of prior comparable long-term storage capacitors. In addition, the voltage decay characteristic of my system can be selected so that the terminal voltage remains substantially constant over a long period or even increases for a predetermined time before starting to decay. At the same time, the capacitor network can be wound in single capacitor roll following the usual capacitor manufacturing techniques and is comparable in size to a conventional long-term storage capacitor. While we have specifically illustrated two and three capacitor networks embodying the principles of this invention, it should be understood that networks employing even a greater number of capacitors are also feasible.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A long-term energy storage network comprising first and second capacitors connected together in series, said first capacitor having a voltage impressed thereon of one polarity, said second capacitor having a larger voltage impressed thereon of opposite polarity, said second capacitor also having a longer time constant than said first capacitor, and a third capacitor having a time constant of the same order as that of said second capacitor, said third capacitor being connected in parallel with said first and second capacitors so that said electrical charges from said first and second capacitors continually offset the electrical charge loss occurring in said third capacitor whereby a substantially constant voltage is available across said network.

2. A long-term energy storage network as defined in claim 1 wherein the absolute value of the ratio of said smaller and larger voltages is equal to or greater than the ratio of said smaller and larger time constants but less than unity.

3. A long-term energy storage network comprising first and second capacitors connected together in series, said first capacitor having a time constant RC1, said second capacitor having a longer time constant R2C2, a third capacitor connected in parallel with said first and second capacitors, said third capacitor having an effective resistance R3, terminals connected to said capacitors so that said first capacitor is chargeable individually to a voltage of one polarity and said second capacitor is chargeable individually to a greater voltage of the opposite polarity whereby the net voltage across said third capacitor upon self-discharge of said capacitors decays at a slower rate than said voltage on said second capacitor.

4. A long-term energy storage network as defined in claim 3 wherein initially the absolute value of the ratio of said second and first voltages is at least equal to $$\frac{\frac{R1R2}{R3}(C1+C2)+R1C1}{\frac{R1R2}{R3}(C1+C2)+R2C2}$$

5. A long-term energy storage network as defined in claim 4 wherein said absolute value is less than unity.

References Cited

UNITED STATES PATENTS

| 2,479,335 | 8/1949 | Fox | 307—108 X |
| 2,958,773 | 11/1960 | Langan | 328—78 |
| 2,981,890 | 4/1961 | Ruehlemann | 328—78 X |
| 3,032,714 | 5/1962 | Cohen | 320—1 X |

BERNARD KONICK, Primary Examiner

J. F. BREIMAYER, Assistant Examiner

U.S. Cl. X.R.

307—110; 317—260